United States Patent [19]

Kondo et al.

[11] Patent Number: 5,157,526
[45] Date of Patent: Oct. 20, 1992

[54] UNABSORBING TYPE POLARIZER, METHOD FOR MANUFACTURING THE SAME, POLARIZED LIGHT SOURCE USING THE SAME, AND APPARATUS FOR LIQUID CRYSTAL DISPLAY USING THE SAME

[75] Inventors: Katsumi Kondo, Katsuta; Junichi Hirakata; Osamu Ito, both of Hitachi; Teruo Kitamura, Katsuta; Shuichi Ohara, Hitachi; Naoki Kikuchi, Mobara; Masato Shimura, Hitachi, all of Japan

[73] Assignee: Hitachi, Ltd., Tokyo, Japan

[21] Appl. No.: 723,964

[22] Filed: Jul. 1, 1991

[30] Foreign Application Priority Data

Jul. 6, 1990 [JP] Japan .................................. 2-178674
Mar. 7, 1991 [JP] Japan .................................. 3-41664

[51] Int. Cl.$^5$ ........................ G02F 1/1335; G02B 5/30; G02B 27/28
[52] U.S. Cl. ........................... 359/63; 359/487; 359/488; 359/495; 359/497
[58] Field of Search .............. 359/63, 487, 488, 495, 359/497, 498

[56] References Cited

U.S. PATENT DOCUMENTS

| | | | |
|---|---|---|---|
| 2,492,809 | 11/1938 | Marks | 359/487 |
| 3,912,920 | 10/1975 | Kubota | 359/487 |
| 3,998,524 | 12/1976 | Hubby, Jr. et al. | 359/496 |
| 4,025,688 | 5/1977 | Nagy et al. | 359/63 |
| 4,427,741 | 1/1984 | Aizawa et al. | 359/63 |
| 4,515,441 | 5/1985 | Wentz | 359/487 |
| 4,556,292 | 12/1985 | Mathyssek et al. | 359/487 |
| 4,592,623 | 6/1986 | Yamamoto et al. | 359/63 |
| 4,643,529 | 2/1987 | Hosonuma et al. | 359/63 |
| 4,798,448 | 1/1989 | van Raalte | 359/73 |
| 4,966,438 | 10/1990 | Mouchart et al. | 359/495 |
| 5,096,520 | 3/1992 | Faris | 359/487 |

FOREIGN PATENT DOCUMENTS 0121821   5/1988   Japan ................................. 359/73

*Primary Examiner*—Janice A. Howell
*Assistant Examiner*—Anita Pellman Gross
*Attorney, Agent, or Firm*—Antonelli, Terry, Stout & Kraus

[57] ABSTRACT

The polarizer of the present invention is composed of mediums having different refractive indices, by which ordinary light in incidented light is wholly reflected at a boundary between laminated medium I and medium II and extraordinary light is transmitted through the medium II. The medium II is so arranged as to be almost 45° to the light axis, and thickness of the medium II is selected as a value with which the medium II works as a half wave length plate to the transmitting light. The polarizer, which has high transparency by reduction of absorption and is able to make most of incident light be similarly polarized light, is obtained. A polarizer for and apparatus for bright liquid crystal display, which is able to be enlarged to a large size display without light absorption, can be provided.

16 Claims, 8 Drawing Sheets

UNABSORBING TYPE POLARIZER, METHOD FOR MANUFACTURING THE SAME, POLARIZED LIGHT SOURCE USING THE SAME, AND APPARATUS FOR LIQUID CRYSTAL DISPLAY USING THE SAME

BACKGROUND OF THE INVENTION

The present invention relates to a polarizer which exhibits high brightness, a method for manufacturing the polarizer, and an apparatus for display using the polarizer.

In an apparatus for liquid crystal display of the prior art, a polarizing plate having dichromatic absorption of light (dichromatic polarizer) has been used as an element for polarizing light. The polarized light described above can be obtained by transmission and absorption respectively of two kinds of polarized light which cross over each other at a right angle when unpolarized external light is incident on the polarizing plate and transmitted. But by the method described above, as one of the polarized components is absorbed, more than half of the light becomes discarded. Accordingly, substantial light transmittance of polarizing plate which is generally used generally at the present is about 40%, and such a polarizing plate is a problematic area in optical apparatus for which brightness is required.

Further, for obtaining a display of high contrast by increasing the degree of polarization (degree of polarizing) of the dichromatic polarizing plate, it is necessary to concurrently increase a light absorbing fraction, and light transmittance of the polarizing plate which is used in a current apparatus for display of high contrast has a tendency to decrease more. This tendency is especially remarkable in a color display. Therefore, it is the present status that a polarizing plate having low light transmittance must be used in order to increase the saturation of color.

As one way to reduce the light loss a low as possible, for instance, a method which reduces the light loss caused by reflection by decreasing the number of boundaries using concurrently the polarizing plate as one of the substrates of liquid crystal cells has been proposed (JP-A-61-221728 (1986)).

Also, a proposal to reduce the light loss is by a method in which, after transmitting light and reflecting light are separated in linear polarized beams which cross over each other at a right angle by a beam splitter, both of the light beams are made to have the same polarized light by transmitting the beams through a half wave length plate and are made parallel by reflecting with a mirror. Consequently, the degree of polarization is increased without the accompanying phenomenon of light absorption (JP-A-2-69715 (1990)).

As far as using the dichromatic polarizing plate in practical use at the present, the loss of light at the polarizing plate can not be depressed and, accordingly, various kinds of problems are generated.

For instance, with an reflecting type apparatus for liquid crystal display which utilizes natural light, there is a problem that the display of white is not obtainable and only gray is obtainable due to the loss of light at the polarizing plate even though the display is made brighter. On the other hand, with an transmitting type apparatus for liquid crystal display which has a light source, there are problems including that an increment of illuminance in order to obtain enough brightness is accompanied by an increment of consuming power and heat generation. These problems are especially severe in an apparatus for color display which requires a color filter.

The method which is disclosed in JP-A-2-69715 (1990) requires optical members such as a beam splitter and a reflecting mirror etc., and it is difficult to obtain a light source having a large area in spite of enlarging of the apparatus. For instance, it is difficult to use as a back light for an apparatus for liquid crystal display of A5 size. The difficulty is same for both the direct viewing type and the reflecting type.

The first object of the present invention is to provide a polarizer having high optical transmittance, a large area, and a thin thickness by decreasing dichromatic absorption which is a main cause of light loss of such optical members as an apparatus for liquid crystal display.

The second object of the present invention is to provide a method for manufacturing the polarizer.

The third object of the present invention is to provide an apparatus for bright liquid crystal display.

The fourth object of the present invention is to provide a polarizer and an apparatus for liquid crystal display which exhibit improved brightness without lowering display contrast.

The fifth object of the present invention is to provide a polarized light source which uses a polarizer having high optical transmittance by decreasing optical absorption of a polarizing plate in the polarizer and which can be enlarged to a large area.

Further, the sixth object of the present invention is to provide an apparatus for display using the polarized light source described above.

SUMMARY OF THE INVENTION

The present invention achieves the objects described above by providing:

(1) An unabsorbing type polarizer which is characterized in comprising:
- a medium I which is provided with birefringence to yield two or three polarized modes each having a different refractive index, and
- a medium II which is provided with a surface or a surface layer having a lower refractive index than the largest refractive index among the two or three refractive indices of the medium I and with optical activity, and in that

- the medium I and the medium II are laminated alternately to compose a plurality of layers, and
- boundaries of the laminated layers are set at an angle to make one of the polarized lights which are transmitted through the medium I be almost reflected and make another be almost transmitted through the medium II at the boundary of the medium I and the medium II.

(2) An apparatus for liquid crystal display comprising
- a pair of substrates having conductive film, at lest one of which is transparent,
- a liquid crystal panel having a layer of the liquid crystal which is sandwitched between the substrates,
- a means of polarization of light which is incidented to the liquid crystal panel, and
- a means of operation of the liquid crystal layer by giving electric charge to the conductive film, characterized in that the means of polarization of light is composed of medium I which is provided with birefringence to yield two or three polarized modes each having a different refractive index, and medium II which is provided with a surface or a surface layer having a lower refractive index than the largest refractive index among the two or three refractive indices of the medium I, and optical activity, and a boundary between the medium I and the medium II is set at an angle to make one of the polarized lights which are transmitted through the medium I be almost reflected and make another be almost transmitted through the medium II at the boundary.

(3) A method for manufacturing a polarizer which is characterized in comprising the steps of forming a laminated body, which comprises medium I of a predetermined thickness which is provided with birefringence to yield two or three polarized modes each having a different refractive index, and medium II of a pretermined thickness which is provided with a surface or a surface layer having a lower refractive index than the largest refractive index among the two or three refractive indices of the medium I, and optical activity, by laminating and joining the medium I and the medium II alternately, and forming a film in which the medium I and the medium II are arranged in a striped pattern by cutting the laminated body in the predetermined thickness and predetermined angle so as to compose a boundary of the laminated layers at the angle which makes one of the polarized lights which are incident to and transmitted through the medium I be almost reflected and makes another be almost transmitted through the medium II at the boundary.

(4) A polarized light source and an apparatus for display using the same, which are characterized in comprising a medium I which is provided with birefringence to yield two or three polarized modes each having a different refractive index, and a medium II which is provided with a surface or a surface layer havng a lower refractive index than the largest refractive index among the two or three refractive indices of the medium I, and optical activity, and in that the medium I and the medium II are laminated alternately to compose a plurality of layers, and boudaries of the laminated layers are set at an angle to make one of the polarized lights which are transmitted through the medium I be almost reflected and make another be almost transmitted through the medium II at the boundary of the medium I and the medium II.

Generally, as physical phenomena which generate much polarized light from unpolarized or less poralized light, the following phenomena are known.
1. Birefringence
2. Dichromaticity of absorption
3. Reflection from a dielectic substance Devices (called a polarizing element or a polarizer) which generate polarized light based on each of the physical phenomena described above have been thought out.

Examples are a polarizer utilizing birefringence for taking out only one polarized light by using a characteristic that light is separated into two polarized lights in an optical isomeric medium and a polarizer using dichromaticity of absorption utilizes a character that only one of the poralized lights is absorbed. The poralizer is used in most present liquid crystal displays.

Reflected light from a dielectric substance becomes only one of poralized lights when the angle of incidence takes a special angle (Brewster angle). The polarizers using the characteristic described above can be roughly separated into reflecting polarizers and transmitting polarizers. The present invention concerns the polarizer using the phenomenon of birefringence.

As for the medium I, such a crystal having a large birefringency as calcite is used. An oriented organic high polymer having the structure expressed by following equations (where n and m are integers at least 1) can be used.

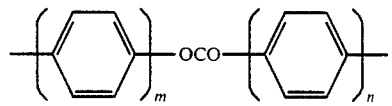

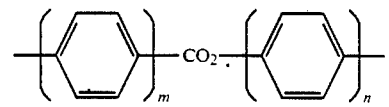

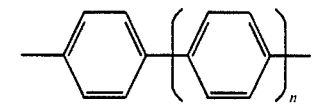

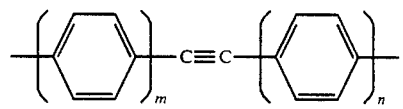

As for the medium II, which need not necessarily have such a large birefringence as the medium I, for instance, films of such substance as polycarbonate, polyester, and nylon etc. are used. But, it is necessary for it to have optical activity. As for the medium I and II, an organic high polymer film which is treated for orientation is preferable.

The film having the medium I and II is obtained by laminating the mediums alternately and joined together to form a plurality of layers as described later and slicing the layers in a predetermined inclined angle to form the film. For the joining of the medium I and II, using of the medium II having an adhesive layer of predetermined refractive index as the surface layer is preferable.

BRIEF DESCRIPTION OF THE DRAWING

FIG. 14 is a schematic view of an example of an overhead projector using the polarized light source of the present invention, and.

DESCRIPTION OF THE PREFERED EMBODIMENTS

The present invention is explained with reference to FIG. 3. The structure is composed of two kinds of mediums, I and II, having optical acivity. The mediums are laminated, and the laminated plane is inclined (angle of the inclination is put as $\phi$) to the boundary AA' of the polarizer. The case in which light is incident at almost a right angle to the boundary AA' of the polarizer is explained.

Figure 3A:
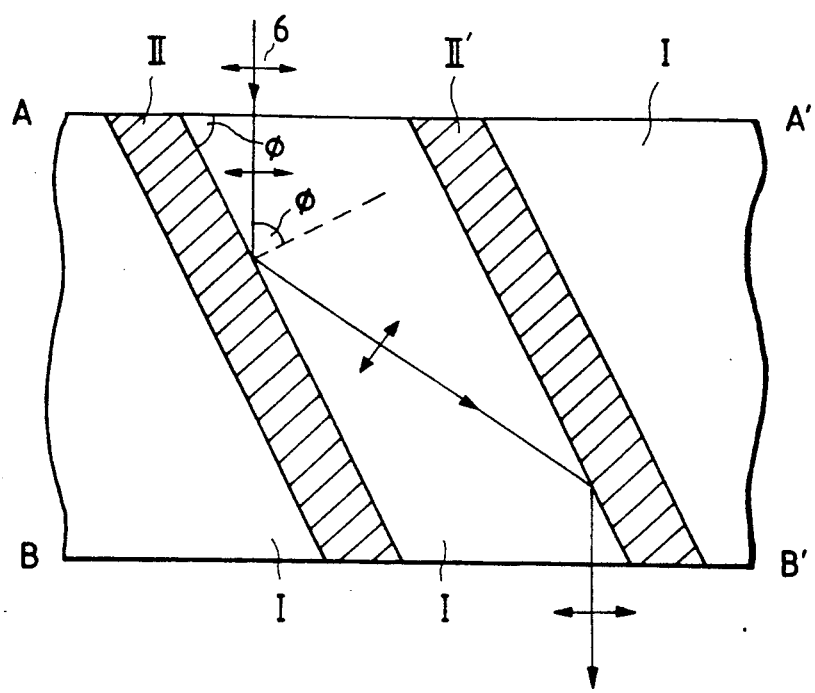
FIG. 3 (a) and (b) are drawings for explanation of operation of the polarizer of the present invention.

The light, which is incident at a right angle to the boundary AA', transmits through the medium I and reaches to the boundary with the medium II. When the angle of inclination $\phi$ with the boundary is large enough, and, the refractive index $n_{II}$ of the medium II is sufficiently smaller than the refractive index $n_I$ of the medium I, the light is reflected wholly at the inclined boundary as shown in FIG. 3(a). The reflected light is transmitted straight forward reaches the boundary with the medium II' where the light is reflected wholly again, subsequently the light is transmitted through the boundary BB' and is emitted.

The wholly reflecting condition of the case is expressed by following equation.

$$\phi > \sin^{-1}(n_{II}/n_I) \quad (2)$$

Figure 3B:
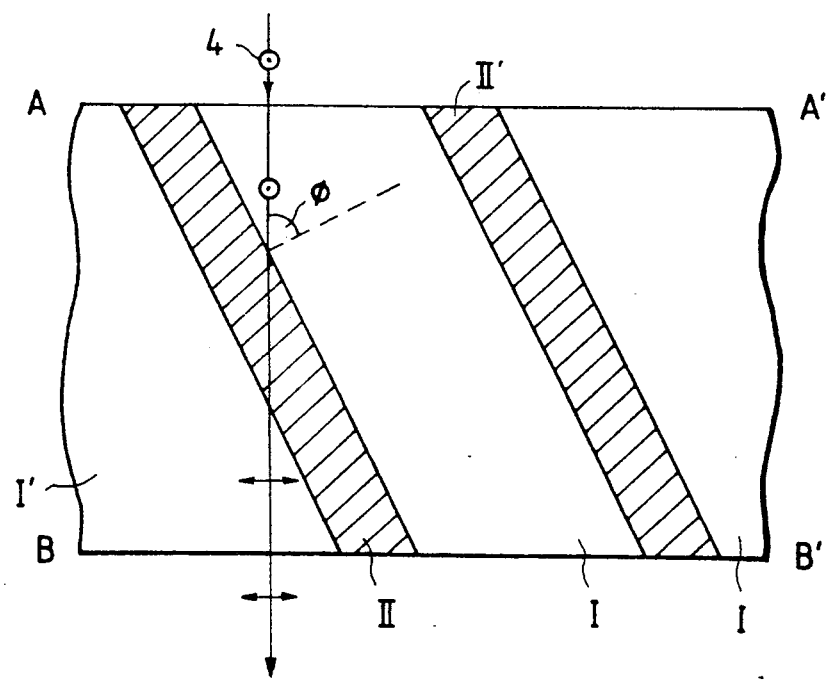

On the other hand, when $n_{II}$ is larger than $n_I$, or the difference is so small as not to satisfy the wholly reflecting condition, the light is transmitted from the medium I to the medium II as shown in FIG. 3(b), subsequently the light is transmitted through the medium I' and is emitted.

When the medium I has birefringency, of which only one refractive index satisfies the wholly reflecting condition, and make the medium II has optical activity (here optical activity means the character to make the polarized component which is vertical to the axis of the polarized light before incidence be emitted when the polarized light is incident and transmitted), the polarized light component, which is wholly reflected (FIG. 3(a)), among the light incident on the polarizer is emitted without changing the polarized plane. On the other hand, the polarized light component which is transmitted (FIG. 3(b)) is emitted with the polarized plane changed. That is, the light is emitted with same polarized plane as the polarized light which is wholly reflected and emitted. By the method described above, the degree of the polarization of the polarized light can be incrased without lowering of the strength of the light by the absorption phenomenon.

In order to make one of the two polarized lights which are crossed over at a right angle reflect wholly and make the another polarized light transmit, following equation may be satisfied.

$$\sin^{-1}(n_{II}/n_{I1}) < \phi < \sin^{-1}(n_{II}/n_{I2}) \quad (1)$$

where $n_{I1}$ and $n_{I2}$ mean the maximum and the minimum of the refractive indices of the medium I respectively and $n_{I1} > n_{I2}$, and $n_{II}$ expresses the refractive index of the medium II near the boundary of the laminated layer.

As revealed by the equation (1), the larger the birefringency $\Delta n = (n_{I1} - n_{I2})$ of the medium I is, the broader the allowable range of the inclined angle becomes and margin which makes allowable the fluctuation in the structure of the polarizer is extended. Also, the angle of visibility is broadened concurrently.

The effect of the light which is incidented on the medium I is explained above, but the light which is incident directly on the medium II does not have the effect described above. Nevertheless, by making the medium I sufficiently thicker than the medium II, almost of the incident light can be utilized as described above and the effect of the present invention is remarkable.

Figure 4:
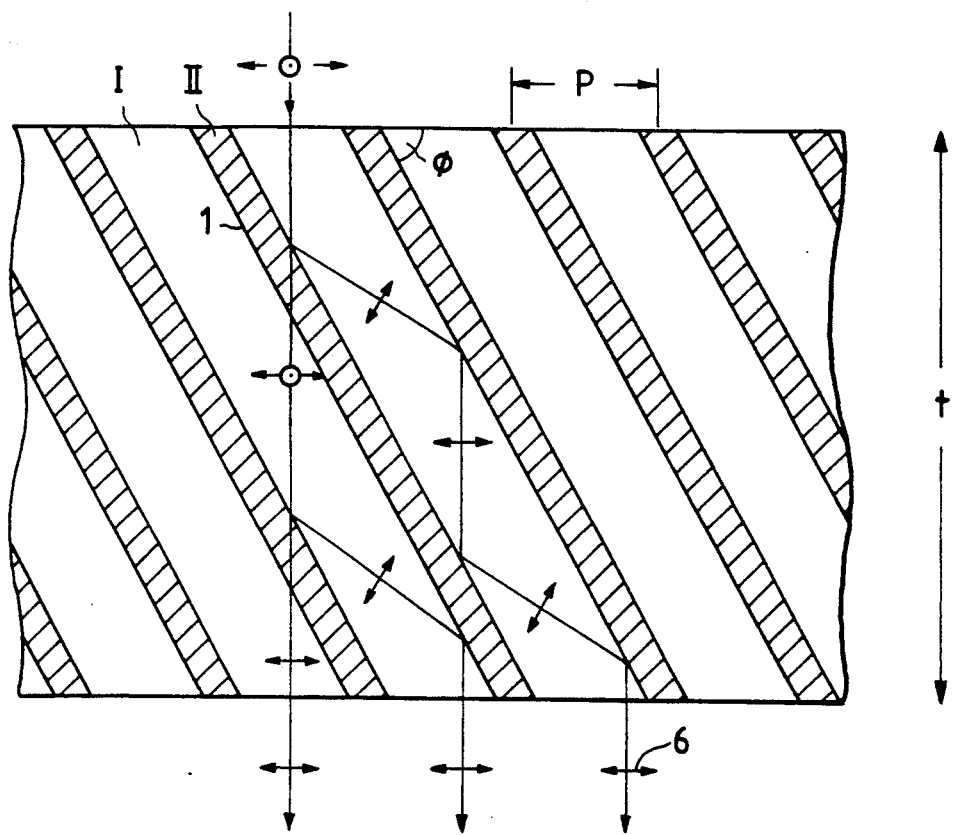
FIG. 4 is a drawing for explanation of operation of another polarizer of the present invention.

Further, as shown in the schematic drawing of FIG. 4, by making thickness (pitch p) of both medium I and medium II thin enough in comparison with thickness of the polarizer (t), both light which is incident directly on the medium II and the light which is transmitted to the medium II after being incident on the medium I first are reflected (or transmitted) many times at the boundaries between medium I and medium II. By increasing the number of times light reaches the boundaries between medium I and medium II as described above, the degree of polarization can be increased.

The above explanation is for light which is incident on the polarizer at a right angle, but the same effect can be obtained by light which is incidented at an oblique angle as long as the light satisfies both of the conditions of whole reflection and transmission shown in FIG. 3. For instance, in the case of an apparatus for liquid crystal display, when both the light source and the liquid crystal panel have large areas and are seen obliquely, a display having enough contrast can be obtained as long as both of the conditions of whole reflection and transmission shown in FIG. 3 are satisfied.

The present invention is explained concretely by the following embodiments.

Embodiment 1

Figure 1:
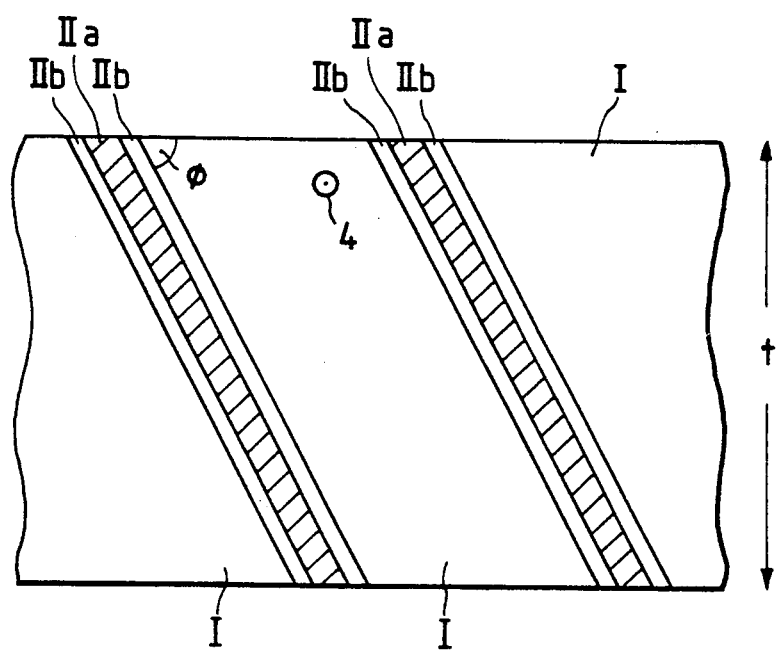
FIG. 1 is a schematic sectional side elevation of the polarizer of the present invention.
Figure 2:
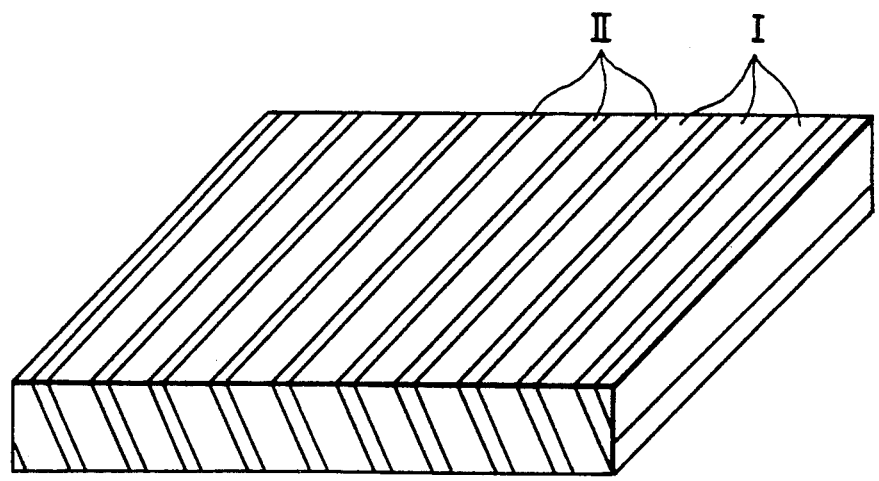
FIG. 2 is a schematic perspective view of the polarizer shown in FIG. 1.

A polarizer having high optical transmission, which is the first object of the present invention, is shown in FIGS. 1, 2 and 3. FIG. 1 is a part of a schematic sectional side elevation of the polarizer of plate type. FIG.

2 is a schematic perspective view of the polarizer. And, FIG. 3 is a schematic cross section of the enlarged polarizer.

The polarizer is composed of medium I and medium II which have different optical properties, and has a laminated structure having oblique boundaries of the mediums. The medium I is composed of calcite which is polished for optical use, and which has an optical axis perpendicular to the face of the paper. The refractive index of the medium I to extraordinary light $n_{I1}$ is 1.486, and to ordinary light $n_{I2}$ is 1.658. And the medium II is composed of an extended film of polycarbonate and an adhesive agent (Canada balsam). The refractive index of the polycarbonate to each of extraordinary light and ordinary light are 1.590 for $n_{II1}$ and 1.585 for $n_{II2}$, respectively, and the refractive index of the adhesive agent, $n_{III1}$, is 1.550, and all of the refractive indexes are smaller than the refractive index $n_{I2}$ of the medium I $n_{I2}$. The angle of inclination is 75° and the thickness of the polarizer is 10 mm. As the light source, a plane light source which was composed of rod type luminescent tubes and photoconductors made of acrylic resin was used.

As shown in FIG. 3, the light among the lights from the light source, which is incident the boundary AA' of the polarizer at a right angle, is incident to the boundary between the medium I and the medium II at the incidence angle $\phi$. At the time, as ordinary light fulfills the condition of whole reflection but extraordinary light does not fulfill the condition, the ordinary light is wholly reflected (FIG. 3a) and only the extraordinary light is transmitted into the medium II (FIG. 3b). Here, the polycarbonate film the medium II, is so arranged that the axis of the light becomes almost 45° to the plane of the paper. And the thickness is so selected as to work as a plate of a half wave length to the light which is incident and propagated. That is, the phase difference, $d\Delta n$, is so set as to be 0.275 µm at passing through the medium II (d is length of the optical path). Accordingly, the polarized plane is rotated about 90 degrees by transmitting the medium II. Although an inorganic crystal (Calcite) was used as the medium I in the present embodiment, it does not matter whether it is organic or inorganic if the substance has the optical properties the values of which allow the effect of the present invention be realized; and an extended high polymer film can be used in the same manner as the medium II.

Also, the thickness of 10 mm as the polarizer is remarkably thicker than the thickness of a conventional dichromatic polarizing plate of at most 1 mm, but it is possible to make the polarizer thin as a whole by laminating of a plurality of thinly extended high polmer films etc.

Further, a flat plane type is shown in FIG. 1, but it need not necessarily be flat and, depending on the object, for example, a curved plane type or a spherical plane type may be usable.

Embodiment 2

Another embodiment to achieve the first object of the present invention is shown in FIG. 4.

Comparing embodiment 2 with embodiment 1, the ratio (p/t) of pitch (p) of the medium to the thickness (t) of the polarizer was made remarkably small (<1). That is, t=5 mm, and p=0.5 mm. And as the material for the medium I, a liquid crystalline high polymer which was obtained by polymerization of a liquid crystalline compound having following structure by irradiation of ultraviolet light was used.

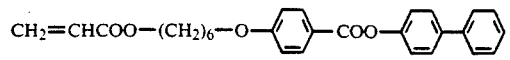

The method of orientation of the high polymer comprises the steps of;
inserting the liquid crystalline compound between glass substrates which are treated with by rubbing,
heating at 80° C. to make the compound nematic phase of liquid crystal,
solififying the compound by photopolymerization with by irradiation of ultraviolet light while maintaining the temperature at 80° C., and
obtaining the film which is oriented uniformly.

Subsequently, the film is peeled off from the glass substrate and laminated.

The refractive indices of the obtained film were 1.72 for extraordinary light, and 1.49 for ordinary light respectively. As for the medium II and the adhesive agent, the same materials used in embodiment I were used. The angle of the inclination at boundary of the adhesion plane $\phi$ was 70°.

The polarizers which are obtained by embodiments 1 and 2 have a brightness about 1.5 times that of conventional polarizers.

Embodiment 3

The embodiment of an apparatus for bright liquid crystal display, which is the third object of the present invention, is explained.

Figure 5:
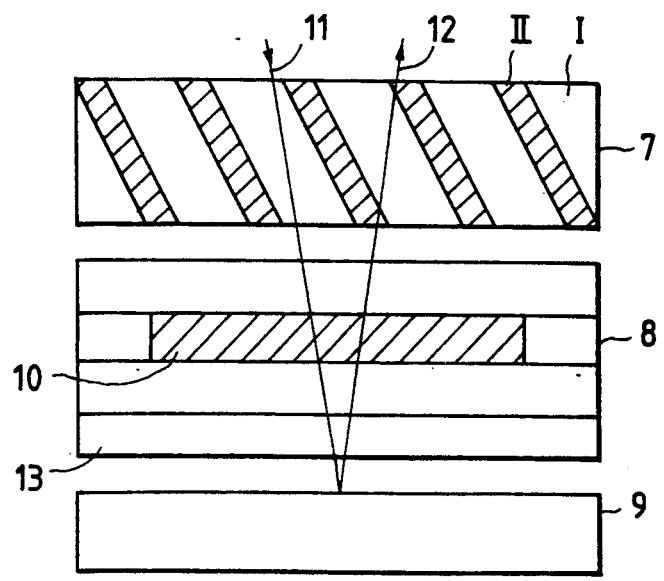
FIG. 5 is a schematic cross section showing an apparatus of reflecting type liquid crystal display of the present invention.

FIG. 5 is a schematic drawing illustrating the embodiment of the apparatus for a reflecting type liquid crystal display. The light 11 is incident on the polarizer 7 of the present invention first, and is transmitted and converted to polarized light having a larger degree of polarization with little loss of light by absorption, and subsequently, the light is incident on the liquid crystal panel 8 and reflected at the reflecting plate 9 to be the reflected light 12, and is emitted.

Figure 6:
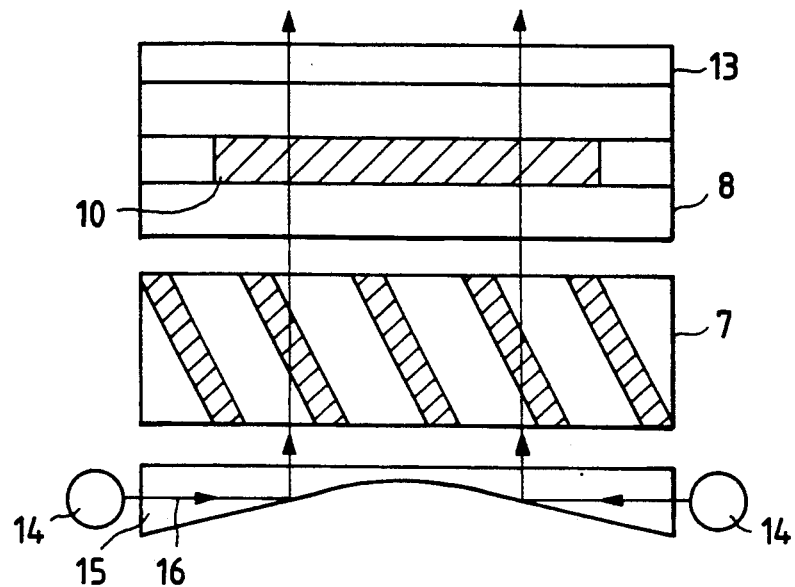
FIG. 6 is a schematic cross section of an apparatus of transmitting type liquid crystal display of the present invention.

FIG. 6 is a schematic drawing illustrating the embodiment of the apparatus for a transmitting type liquid crystal display. The polarizer 7 is arranged between the light source 14 and the liquid crystal panel 8. The light 16 from the light source is reflected in the photoconductor 15 and is incident on the polarizer 7 first, and is transmitted and converted to polarized light having larger degree of polarization with little loss of the light by absorption as in the case of the apparatus for the reflecting type liquid crystal display, and subseqnetly is incident in the liquid crystal panel 8.

When the polarizer 7 of the first embodiment is used with the same brightness as a conventional polarizer, power of the light source can be reduced by at least 30%.

Embodiment 4

The embodiment of the polarizer for a display having higher contrast than the display using conventional polarizers, and, in addition, having an improvement in brightness, which is the fourth object of the present invention, is explained.

Figure 7:
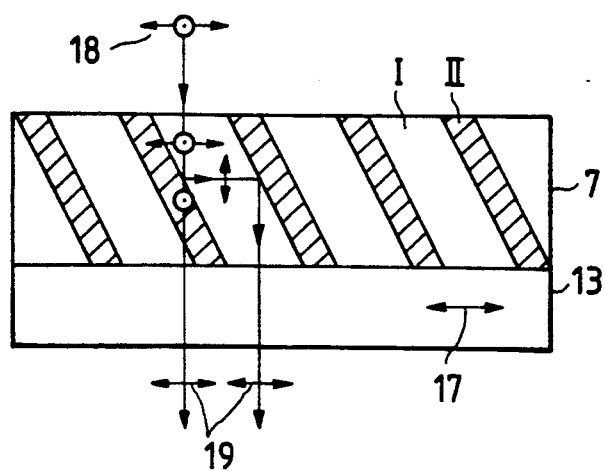
FIG. 7 is a schematic cross section of the polarizer of another embodiment of the present invention.

As shown in the schematic drawing of FIG. 7, the dichromatic polarizing plate 13 is laminated with the polarizer 7 of the first embodiment. The polarizing axis 19 of the light which is transmitted through the polarizer 7 and the transmitting axis 17 of the dichromatic polarizing plate 13 are parallel. And the dichromatic polarizing plate 13 is arranged at the opposite side to the light source irrespective of using natural light from external or using the annexed light source.

Figure 8:
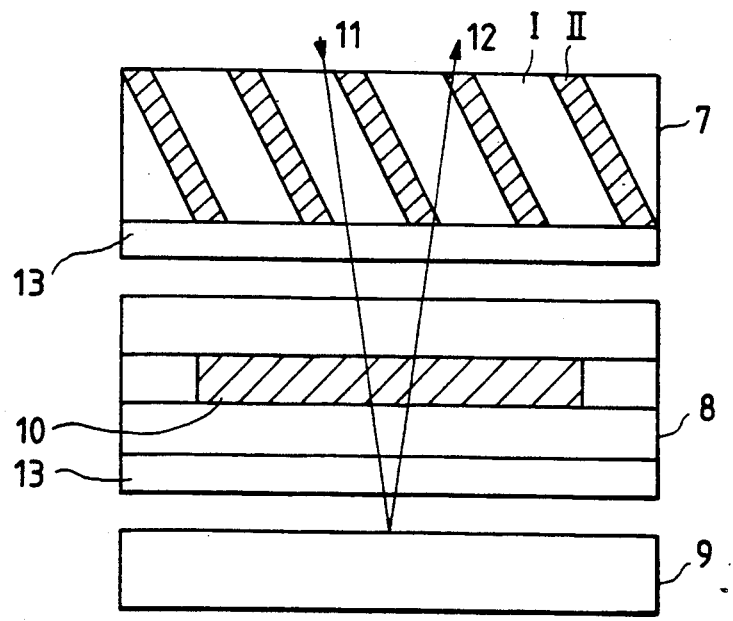
FIG. 8 is a schematic cross section of another apparatus of reflecting type liquid crystal display of the present invention.
Figure 9:
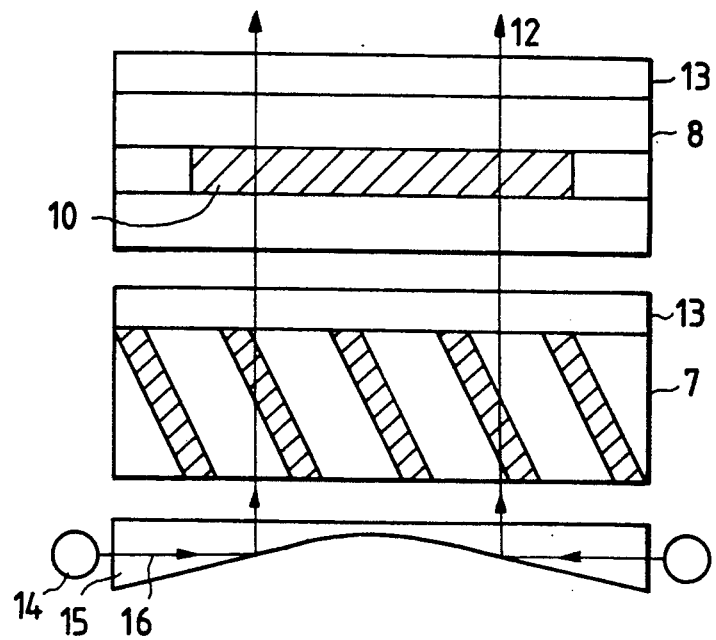
FIG. 9 is a schematic cross section of another transmitting type liquid crystal display of the present invention.

Schematic drawings of the apparatus for a reflecting type liquid crystal display and the apparatus for transmitting type liquid crystal display are illustrated in FIGS. 8 and 9, respectively. These apparatus for liquid crystal display use the polarizer 7 of the first embodiment annexed with the dichromatic polarizing plate 13.

Figure 10:
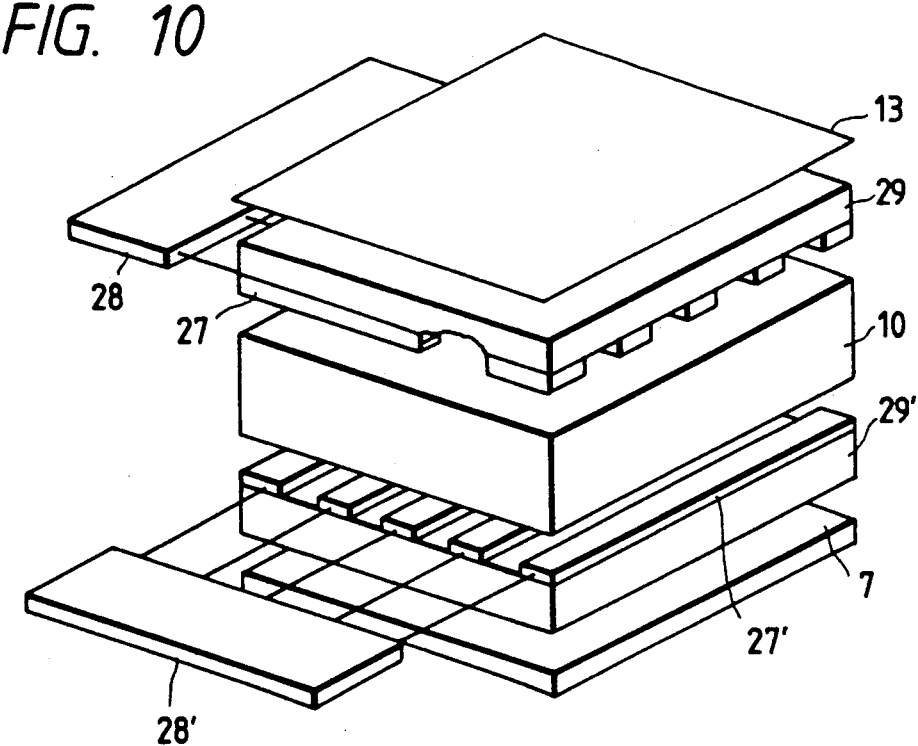
FIG. 10 is a schematic perspective view of an apparatus of liquid crystal display of the present invention having an operation circuit.

A schematic perspetive view of the apparatus for liquid crystal display having an operating circuit is illustrated in FIG. 10.

A liquid crystal cell is composed of the liquid crystal 10 which is held by transparent substrates, 29 and 29', each of which have transparent electrodes, 27 and 27', respectively, and an exterior of the liquid crystal cell are the polarizer 7 of the present invention and the dichromatic polarizing plate 13. The transparent electrodes, 27 and 27', are operated by the operation circuits, 28 and 28', and are scanned in accordance with display pattern. The liquid crsytal is operated by charging of voltage to the liquid crystal 10. The display is performed by incidence of the transmitting light from the bottom side of the polarizer 7.

As for the liquid crystal display types, super TN type, TFT type, strong dielectric liquid crystal display type, super homeotropic type etc. are known, but it is needless to say that the present invention is applicable to the type as far as it uses the polarizer.

The light source which uses the polarizer of the present invention has an extremely small loss of light energy so that, for instance, the light source can be used as a lighting apparatus as a headlight of cars. In the case of a headlight, if the polarized direction is inclined to the right by 45°, for example, and the driver wears polarized glasses (dichromatic absorption exists) which transmit only polarized light having same polarized direction, the strength of the headlight of the oncoming car at night can be reduced considerably and it is effective for improvement of safety. The same effect is obtained by adhesion of a dichromatic polarized film having the same polarizing direction as the polarized glasses on the windshield of the car instead of he polarized glasses.

Further, the same effect is obtained by adhesion of the dichromatic polarized film on rear window glass or sideview mirror. Especially, when a following car uses a headlight of same type, the effect of prevention of the dazzling is remarkable by selection of the polarized directions which are inclined to right by 45° or to left by 45°, respectively.

The polarizer of the present invention can be used not only for the apparatus for liquid crystal display, but also, for a instance, as an optical acceptor for polarized light detector etc.

Embodiment 5

The manufacturing method of the polarizer, which is the third object of the present invention, is explained.

Figure 11A:
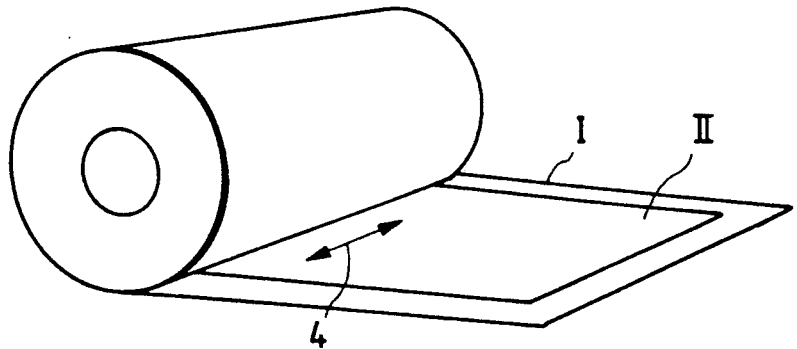
FIG. 11 (a) and (b) are drawings for explanation of manufacturing method of the polarizer of present invention.
Figure 11B:
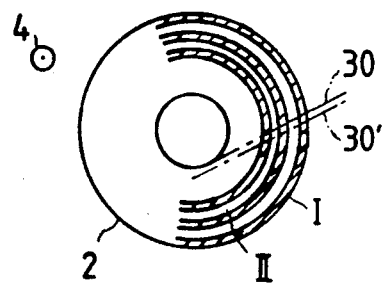

The medium I and the medium II are laminated and wound as shown in FIG. 11 (a), and the layers are adhered each other and solidified to form the laminated body 2 in a roll as shown in FIG. 11 (b).

Next, the roll is sliced along the cutting plane, 30 and 30', which are so selected as to form a predetermined angle ($\phi$) with the boundary between the medium I and II. The slicing is so performed that the direction of the shearing force coincides with the direction of the optical axis 4. By cutting in the manner, deformation of the optical axis by the shearing force can be suppressed to be small.

By using the polarizer, an apparatus for liquid crystal display having high brightness can be obtained.

Embodiment 6

Figure 12:
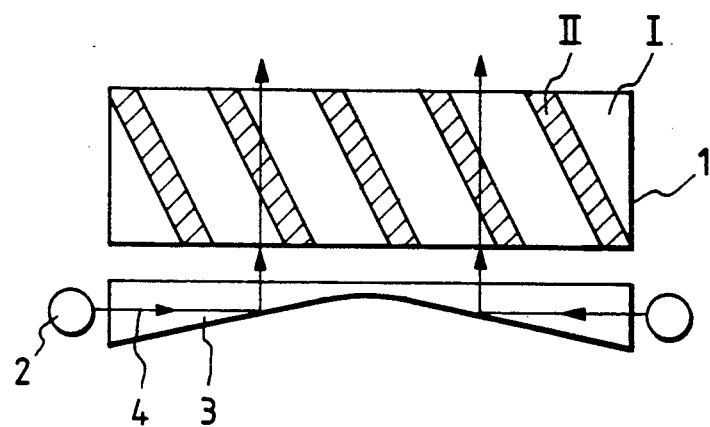
FIG. 12 is a part of a schematic sectional side view of the polarized light source.
Figure 13:
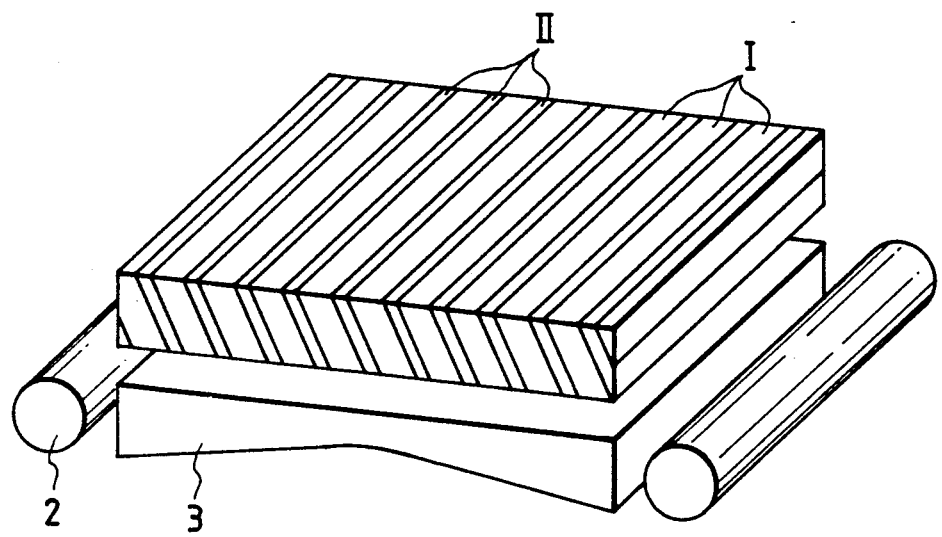
FIG. 13 is a schematic perspective view of the polarized light source in FIG. 12.

The embodiment of a polarized light source, which is the sixth object of the present invention, having high efficiency of light utilization by using the polarizer having high light transmittance is illustrated in FIGS. 12 and 13. The polarized light source comprises a light source emitting unpolarized light or low polarized light and a polarizer for increasing the degree of polarization.

Embodiment 7

Figure 14:
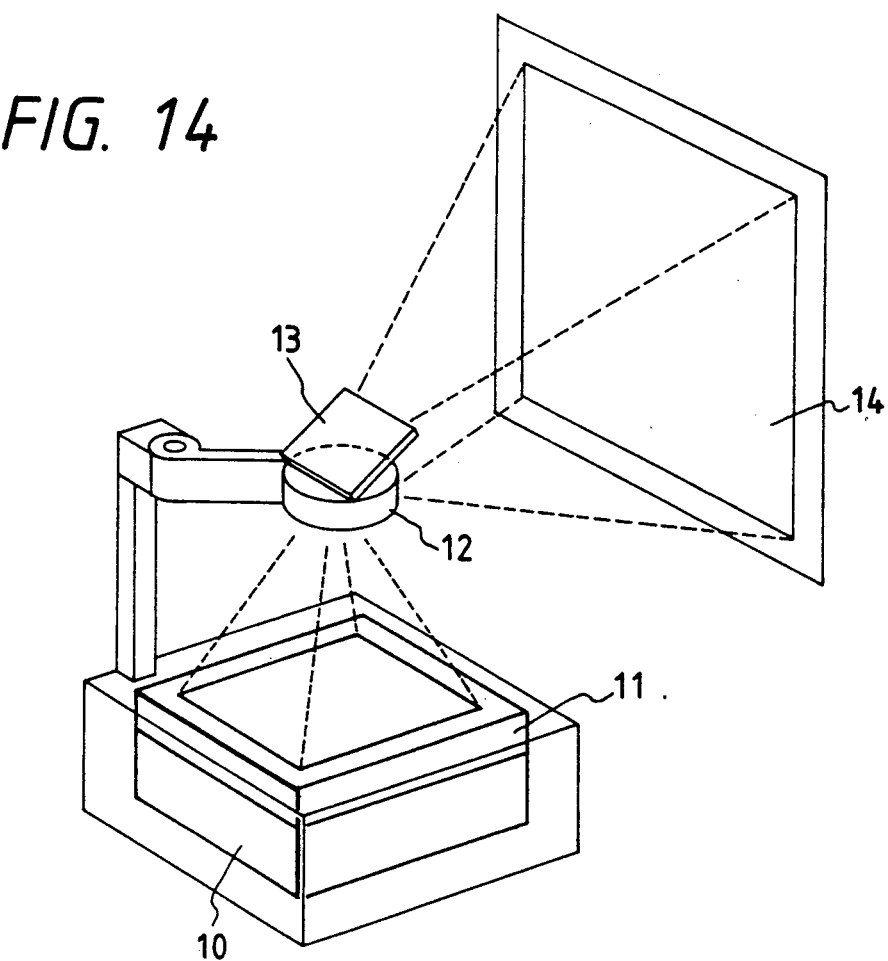

An example of an overhead projector (OHP) using the polarized light source of the present invention is illustrated in FIG. 14. The polarized light source 10 of the present invention is installed at lower part of the body of the projector. The polarized light transmits through the liquid crystalline panel 11, an enlarging lens 12, and reflecting mirror 13, and is projected to the screen 14. Compared with a conventional projector of same brightness, 30% of the consuming power can be saved.

Further, depending on the object, another type of projection, in which the polarized light source is installed at an upper part of the projector and irradiates the liquid crystalline panel which is installed beneath the polarized light source with polarized light, and the transmitted light through the liquid crystalline panel is projected by the enlarging lens 12 and the reflecting mirror 13, can be selected.

Figure 15:
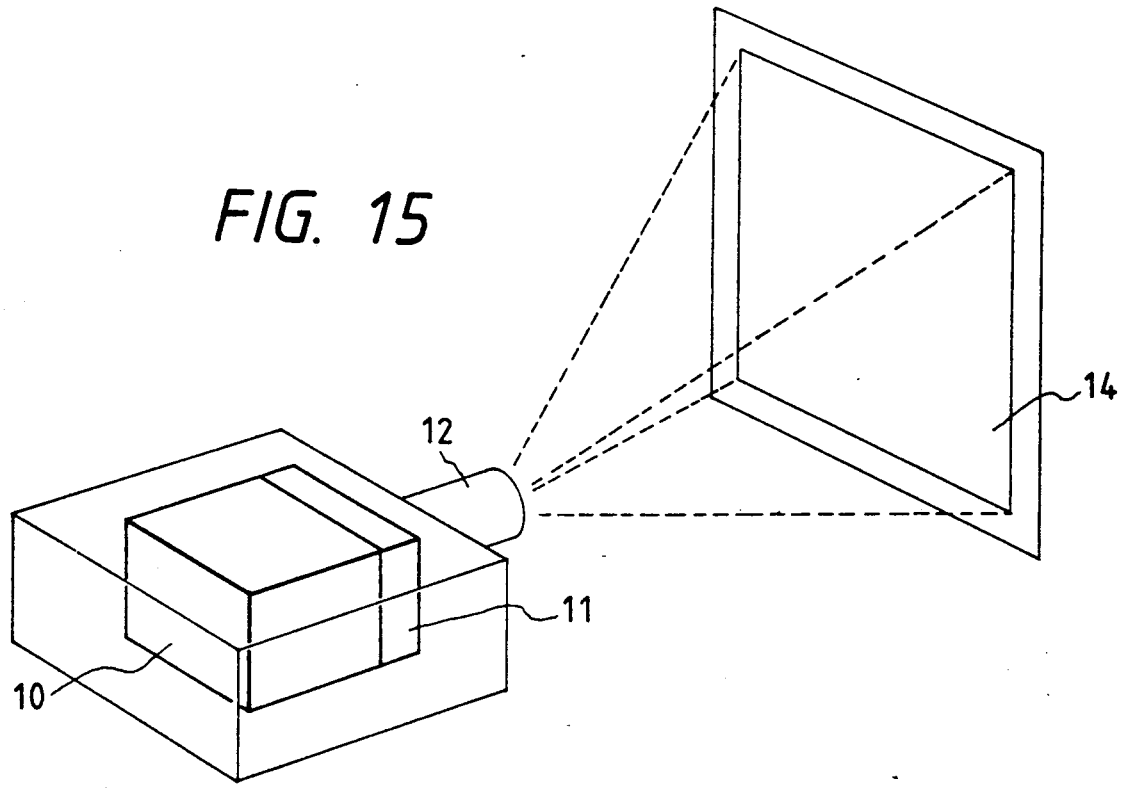
FIG. 15 is a schematic view of an example of a liquid crystalline projector using the polarized light source of the present invention.

The liquid crystalline projector using the polarized light source of the present invention the as same as the overhead projector is illustrated in FIG. 15. In the case this example, more than 30% of the consuming power of the light source can be saved in comparison with a conventional liquid crystalline projector of same brightness as with the overhead projector.

By the present invention, a polarized light source having high light transmittance can be provided. The polarized light source is able to considerably save power for the light source while by being used with the same brightness as a conventional light source, and is able to improve the life of the light source.

What is claimed is:

1. An apparatus for display comprising:
  a polarized light source,
  a liquid crystalline display device, and
  a means for focusing an image, which is formed by the liquid crystalline display device, on a screen,
  characterized in that
  said polarized light source comprises
  a light source generating unpolarized light or weakly polarized light, and
  a polarizer for providing highly polarized light by receiving and transmitting light from said light source, and that
  said polarizer comprises
  a medium I which has birefringence so as to be able to generate tow or three polarized modes having different refractive indices, and
  a medium II which has the property of rotating polarized light passing through it and a surface having a refractive index smaller than the largest refractive index among the two or three refractive indexes of said medium I, wherein said medium I and said medium II are laminated alternately to form a plurality of layers, and boundaries between said laminated layers are arranged at an angle with respect to a surface of said polarizer such that one component of polarized light transmitted through said medium I is reflected at the boundary between said medium I and said medium II, while another component or components polarized light is transmitted through said medium II.

2. An apparatus for liquid crystal display comprising:
a conductive film,
a pair of substrates, at least one of which is transparent,
a liquid crystal panel which is composed of liquid crystal layer that is inserted between said pair of substrates,
a means for operating the liquid crystal layer by adding electric charge to the conductive film, and
a polarizer which comprises:
a medium I having birefringence so as to be able to generate two or three polarized modes of different refractive indices and
a medium II having the property of rotating polarized light passing through it and a surface having a refractive index smaller than the largest refractive index among the two or three refractive indices of said medium I, wherein said medium I and said medium II are laminated alternately to form a plurality of layers, and boundaries between said laminated layers are arranged at an angle with respect to a surface of the polarizer such that one component of polarized light transmitted through said medium I is reflected at the boundary between said medium I and said medium II while another component or components of polarized light is transmitted through said medium II.

3. The apparatus for liquid crystal display as claimed in claim 2, wherein said polarizer and an optical reflector are arranged with the liquid crystal panel therebetween.

4. The apparatus for liquid crystal display as claimed in claim 2, wherein a dichromatic polarizing plate is laminated to said polarizer, and said polarizer is so arranged with the dichromatic polarizing plate adjacent the liquid crystal panel.

5. The apparatus for liquid crystal display as claimed in claim 2, wherein a dichromatic polarizing plate is laminated to said polarizer, and said polarizer and an optical reflector are arranged with the liquid crystal panel therebetween.

6. An unabsorbing type polarizer comprising:
a medium I which has birefringence so as to be able to generate two or three polarized modes having different refractive indices, and
a medium II which has the property of rotating polarized light passing through it and a surface having a refractive index smaller than the largest refractive index among the two or three refractive indices of said medium I, wherein
said medium I and said medium II are laminated alternately to form a plurality of layers, and
boundaries between said laminated layers are arranged at an angle with respect to a surface of the polarizer such that one component of polarized light transmitted through said medium I is reflect at the boundary between said medium I and said medium II, while another component or components of polarized light is transmitted through said medium II.

7. The unabsorbing type polarizer as claimed in claim 6, wherein an angle of inclination $\phi$ between a direction of the transmitting light through said medium I and a line normal to the boundaries between said laminated layers satisfies the relation expressed by the following equation (1):

$$\sin^{-1}(n_{II}/n_{I1}) < \phi < \sin^{-1}(n_{II}/n_{I2}) \tag{1}$$

wherein, $n_{I1}$ and $n_{I2}$ are the maximum and the minimum refractive index respectively of said medium I, and $n_{I1} > n_{I2}$, $n_{II}$ is the refractive index of said medium II near the boundaries between said laminated layers.

8. The unabsorbing type polarizer as claimed in any one of claims 6 and 7, wherein said medium II is composed of a layer which has a predetermined refractive index and the property of rotating polarized light passing through it, and an adhesive layer which has a predetermined refractive index and adhesiveness.

9. The unabsorbing type polarizer as claimed in claim 6, wherein the layer of said medium I is formed thicker than the layer of said medium II.

10. The unabsorbing type polarizer as claimed in claim 6 wherein said medium I and/or said medium II are organic high polymers which are oriented in a predetermined direction.

11. The unabsorbing type polarizer as claimed in claim 6 wherein said medium I is liquid crystalline high polymer film.

12. The unabsorbing type polarizer as claimed in claim 6 wherein said polarizer further comprises a dichromatic polarizing plate, and an optical transmitting axis of said dichromatic polarizing plate is so arranged as to be almost parallel to a plane of polarization of light emitted from said polarizer.

13. The unabsorbing type polarizer as claimed in claim 6, wherein
a film thickness of the medium I is so selected as to allow said reflecting light a plurality of reflections before emitting from said polarizer.

14. A polarized light source comprising:
a light source generating unpolarized light or weakly polarized light, and
a polarizer for providing highly polarized light by receiving and transmitting light from said light source,
characterized in that
said polarizer comprises:
a medium I which has birefringence so as to be able to generate two or three polarized modes having different refractive indices, and
a medium II which has the property of rotating polarized light passing through it and a surface having a refractive index smaller than the largest refractive index among the two or three refractive indexes of said medium I,
wherein
said medium I and said medium II are laminated alternately to form a plurality of layers, and boundaries between said laminated layers are arranged at an angle with respect to a surface of the polarizer such that one component of light transmitted through said medium I is reflected at the boundary between said medium I and said medium II, while another component or components of polarized light is transmitted through said medium II.

15. A method for manufacturing a polarizer comprising the steps of:

forming a laminated body by laminating alternately and adhering a medium I having birefringence so as to be able to generate two or three polarized modes of different refractive indices and a medium II of a predetermined thickness having the property of rotating polarized light passing through it and a surface having a refractive index smaller than the largest refractive index among the two or three refractive indices of said medium I, slicing said laminated body at a predetermined angle and to a predetermined thickness so that boundaries between said laminated layers are arranged at an angle with respect to a sliced surface such that one component of polarized light transmitted through said medium I is reflected at the boundary between said medium I and said medium II, while another component or components of polarized light is transmitted through said medium II, and making a film on which said medium I and said medium II are arranged in a striped pattern.

16. A method of manufacturing of polarizer as claimed in claim 15, wherein said medium I and said medium II are composed of organic high polymers oriented in a predetermined direction, and both of said medium I and said medium II are joined together.

* * * * *